May 18, 1965

H. D. DENT 3,184,196

MOUNTING DEVICE

Filed April 20, 1964

INVENTOR.
HARRY D. DENT
BY
*Harry C. Nieves*
ATTORNEY

United States Patent Office 3,184,196
Patented May 18, 1965

3,184,196
MOUNTING DEVICE
Harry D. Dent, 915 W. Walnut, Santa Ana, Calif.
Filed Apr. 20, 1964, Ser. No. 360,976
10 Claims. (Cl. 248—187)

The present invention relates generally to mounting devices, and more particularly to means for mounting a camera or other photographic equipment on a tripod.

Photography has enjoyed ever increasing popularity within the past decade, to a point where today many people spend considerable sums of money for photographic equipment and accessories. Such equipment has increased in quality over the years so that even the newest amateur is able to quickly learn to take satisfactory pictures.

Cameras, including lenses and shutter mechanisms, have so markedly improved within the past several decades that professional pictures can now be obtained with minimum equipment. Also, the quantity of photographic film has increased correspondingly.

In order to obtain optimum restults with certain camera equipment, it is usually necessary to employ means for holding the camera in a steady, fixed position. To this end, a wide variety of tripods have become available, to which the ordinary camera can be affixed so as to be held in substantially any desired fixed position.

Heretofore, satisfactory mounting means for enabling the camera to be quickly and conveniently connected to and disconnected from the tripod have been unavailable. To be sure, various attempts have been made to provide means for accomplishing this, but virtually all prior devices of this nature have been quite complicated in construction and operation and have been relatively cumbersome to use.

It is an object of the present invention to provide mounting means by which an object can be quickly and easily connected to a tripod or any other stationary member.

Another object of the present invention is to provide mounting means as characterized above which is operable to firmly secure a camera or other photographic device to a tripod.

Another object of the present invention is to provide a mounting device as characterized above which comprises a minimum number of parts or components which can be formed of substantially any desired material.

A further object of the present invention is to provide mounting means as characterized above which is "self locking" as a result of being biased to its retaining or holding position.

A still further object of the present invention is to provide mounting means as characterized above which does not require auxiliary levers or wrenches for effecting the holding operation.

An even further object of the present invention is to provide mounting means as characterized above which provides cam means biased into locking engagement with the object to be mounted thereon.

A further object of the present invention is to provide mounting means as characterized above which is simple an inexpensive to manufacture and which is rugged and dependable in operation.

The novel features which I consider characteristic of my invention are set forth with particularly in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
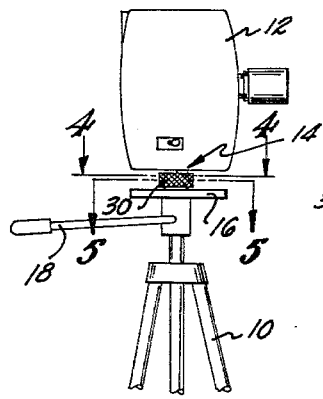
FIGURE 1 is a side elevational view of a camera being held in fixed position on a tripod by a mounting device according to the present invention.

Referring to FIGURE 1 of the drawings, there is shown therein a tripod 10 whereon is mounted a camera 12 by mounting means 14 according to the present invention. The tripod 10 and camera 12, as will be readily apparent, may be of substantially any style or construction. For instance, the tripod 10 may have a movable platform as shown at 16 in FIGURE 1, and manual handle means 18 for positioning such platform as desired. The camera 12 may be a "movie" camera for recording motion or the like, or it may be a "still" camera for taking individual snapshots or slides. In any event, all standard tripods and cameras presently available can be used with the subject mounting means 14.

As shown in FIGURES 2-7 inclusive, the mounting device 14 chosen for illustration of the subject invention, comprises a relatively stationary cylindrical member 20 firmly secured to platform 16 by any appropriate means such as mounting screw 22 and lock washed 24. A suitable through opening is formed in platform 16 and a threaded aperture 22a is formed in the bottom of cylindrical member 20 for receiving the screw 22.

As is well known in the art, fastening screw 22 may be a "captive" screw so as to be an integral part of the platform 16. To provide this, the shank of screw 22 is of reduced diameter adjacent the screw head and the opening in platform 16 is threaded. However, this feature is of little consequence with respect to the instant invention since any means whatever may be employed for securing cylindrical member 20 in a relatively stationary position on platform 16.

Cylindrical member 20 has a cylindrical outer surface 20b relative to the central longitudinal axis 26 of member 20.

At the lower end of member 20 there is formed an annular shoulder 20c as a result of a reduced lower end portion 20d. An annular groove or cutout 20e is formed around the stationary member 20 throughout the intermediate peripheral area thereof.

Formed in the upper portion of cylindrical member 20 is a recess 20f which, as will hereinafter be explained in greater detail, is formed transversely of member 20 so as to be normal to the axis 26 thereof. Such recess 20f is formed with a generally arcuate wall 20g, and is open at the top of the member 20 as shown most clearly in FIGURES 2 and 3. However, as will hereinafter become more apparent, the primary characteristic of recess 20f is that it is formed transversely of the axis 26 so as to open through the cylindrical side wall or surface of the member 20.

The side wall 20g of recess 20f is undercut as at 20h to provide an arcuate lip or ledge 20j. The recess 20f is so formed to receive a suitable mounting member on camera 12.

Figure 6:
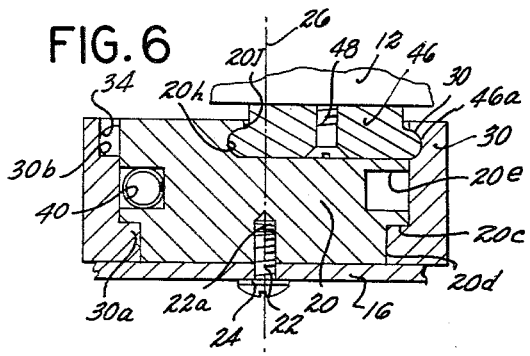
FIGURE 6 is a longitudinal sectional view of such device, taken substantially along line 6—6 of FIGURE 4.
Figure 7:
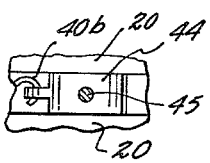
FIGURE 7 is a fragmentary sectional view of a portion of the mounting device, taken substantially along line 7—7 of FIGURE 5.

On cylindrical stationary member 20 is a generally tubular fastening member 30 which is rotatable on member 20 about axis 26. Tubular member 30 is formed with an annular inwardly extending ledge 30a which, as shown in FIGURE 6, extends within the annular recess afforded by the reduced lower end portion 20d of member 20.

Figure 2:
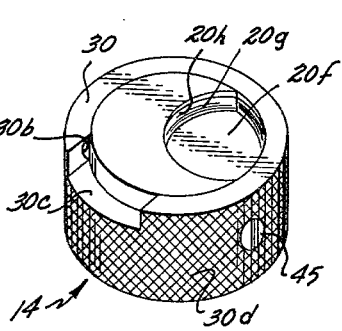
FIGURE 2 is a perspective view of the mounting device of FIGURE 1.
Figure 3:
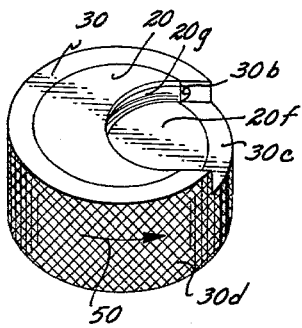
FIGURE 3 is a perspective view similar to FIGURE 2, but showing the mounting means in open position.
Figure 4:
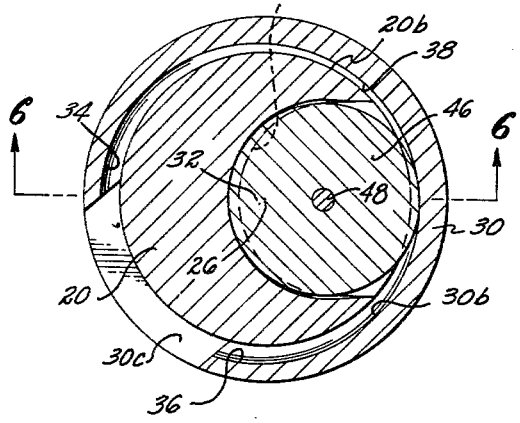
FIGURE 4 is a transverse sectional view of the mounting device taken substantially along line 4—4 of FIGURE 1.
Figure 5:
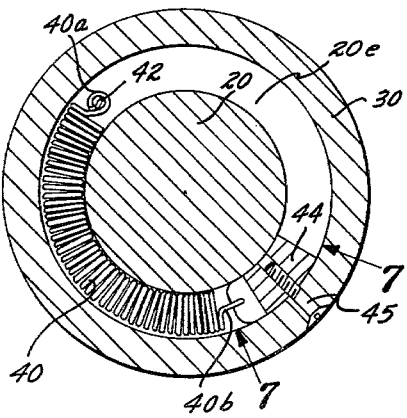
FIGURE 5 is another transverse sectional view of the mounting device taken substantially along line 5—5 of FIGURE 1.

In vertical alignment with the recess 20f when member 30 is mounted on member 20, then is provided on tubular fastening member 30 a cam surface 30b. Such cam surface, as shown in FIGURES 2, 3 and 6, is generally arcuate or semi-circular in cross-section throughout its entire length. It is formed on the interval cylindrical surface of tubular member 30 in eccentric reaction to such internal cylindrical surface. That is, the cam surface 30b is formed with a radius from a center point 32, which center point is spaced a predetermined distance from axis 26. As such, the arcuate cam surface is caused to be deeper at locations 34 and 36 along the length thereof as compared to its depth, at location 38. This causes surface 30b to have a cam action as the member 30 is caused to rotate on stationary member 20.

Fastening member 30 is further provided with a through opening or cutout 30c which is generally U-shaped or square as most clearly shown in FIGURES 2 and 3. Such through opening in the side wall of member 30 is of such size and shape as to correspond to the opening of recess 20f in the side wall of member 20.

Operatively interposed between stationary member 20 and rotatable member 30 is biasing means in the form of a coiled tension spring 40. One end 40a of spring 40 is secured relative to stationary member 20 by a mounting pin 42 attached to member 20 across the annular cutout 20e formed therein. The other end 40b of spring 40 is connected to an arcuate connector 44 which is carried by tubular member 30 by a mounting screw 45. Connector 44 moves in the arcuate cutout 20e with the motion of fastening member 30 about stationary member 20.

As shown most clearly in FIGURES 2 and 3 of the drawings, the exterior cylindrical surface 30d of fastening member 30 may be formed with suitable manual operating means for turning the fastening member 30 on stationary member 20 against the biasing force of spring 40. Such manual means may take the form of knurling as shown in these drawings.

Attached to the underside of camera 12 is a mounting member 46 which may take substantially any appropriate form, but should be so shaped as to conform to the general contour of the recess 20f. A fastening screw 48 is employed to secured mounting member 46 to the camera 12. It extends through an appropriate through opening in member 46 and threadily engages an appropriate aperture on the underside of camera 12. Mounting screw 48 may be a "captive" screw as explained above with respect to screw 22, and as such would be an integral part of member 46.

Mounting member 46 is generally disc-shaped, having a circular outer periphery. Also, such outer periphery may be generally arcuate or semi-circular in cross section, as shown most clearly in FIGURE 6, to conform to the general cross sectional shape of the cutout 20h in wall 20g of stationary member 20.

The camera 12 is secured to tripod 10 in the following manner:

Stationary member 20 is securely fastened to platform 16 by means of the fastening screw 22. Thereafter, with mounting member 46 firmly secured to camera 12, the fastening sleeve 30 is rotated in the direction of arrow 50 of FIGURE 3 so as to move opening 30c of member 30 from the position thereof shown in FIGURE 2 to its position of alignment with the recess 20f as shown in FIGURE 3. Such movement of fastening member 30, of course, is against the force of biasing means 40.

Mounting member 46 is then inserted into the recess 20f through the opening 30c. The circular periphery of member 46 fits within the arcuate cutout 20h in the wall 20g of such recess. The arcuate lip or ledge 20j extends over the top of the marginal edge of member 46.

Thereafter, the tubular fastening member 30 is released causing biasing means 40 to return member 30 to its initial position. However, due to the aforedescribed eccentric relationship between the rotation at path of member 30 and the surface 30b formed therein, the latter operates as a cam surface and engages mounting member 46 as shown most clearly in FIGURES 4 and 6 of the drawings. When this happens, the member 46 is firmly wedged between the arcuate wall 20g or recess 20f and the cam surface 30b of the fastening member 30. The biasing member 40 continues to urge the fastening member 32 toward its initial position thereby further securing the mounting member 46 within the recess 20f.

When it is desired to remove the camera 12 from its fixed position on tripod 10, it is merely necessary to manually rotate member 30 in the counter-clockwise direction shown by the arrow 50. When the cutout 30c of member 30 is aligned with the recess 20f, the mounting member 46 can be removed.

It is contemplated within the scope of this invention that substantially any object other than camera 12 may be mounted in fixed position by means of the subject mounting device. The mounting member 46 may be any appropriate portion of such object as will be readily apparent to those persons skilled in the art.

It is thus seen that the present invention provides mounting means which is particularly well-suited for use in mounting a camera or other photographic device on a tripod or similar relatively stationary member.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A mounting device comprising in combination, a relatively stationary cylindrical member formed with a recess for receiving at least a portion of an object to be mounted thereon, said recess being formed to cause a predetermined amount of said portion to extend beyond the cylindrical surface of said stationary member, a tubular fastening member slidably mounted on said cylindrical stationary member and formed with cam means for engagement with said predetermined amount of said portion of said object, said fastening member being formed with an opening for alignment with said recess in said stationary member to permit insertion and removal of said portion in said recess, and biasing means urging said fastening member into a position where said cam means is in engagement with said predetermined amount of said portion.

2. A mounting device according to claim 1 wherein said biasing means is an elongated tension spring, one end of which is attached to said stationary member and the other end of which is connected to said fastening member.

3. A mountnig device, according to claim 2 wherein said cylindrical stationary member is formed with an arcuate slot wherein said tension spring is positioned, there being mounting means on each of said stationary and fastening members for individually receiving the opposite ends of said tension spring.

4. A mounting device, according to claim 3 wherein the exterior surface of said tubular fastening member is knurled to facilitate manual rotation thereof on said stationary member against the force of said biasing means.

5. A mounting device comprising in combination, a stationary member having a generally cylindrical configuration formed with a recess normal to the axis of said cylindrical configuration for receiving a mounting portion of an object to be mounted thereon, a tubular fastening member mounted on said cylindrical stationary member for rotation thereon about said axis, an arcuate cam surface formed on said tubular fastening member having a center of curvature displaced a predetermined distance from said axis, and spring means interposed between said stationary member and said fastening member to rotate the latter to cause said cam surface to engage said mounting portion to retain said object in fixed position on said stationary member.

6. A mounting device according to claim 5 wherein said fastening member is also formed with a through opening for alignment with said recess to permit said mounting portion to be inserted and removed from said recess.

7. A mounting device according to claim 6 wherein said spring means urges said fastening member to a position wherein said through opening is out of alignment with said recess and said cam surface is in engagement with said mounting portion in said recess.

8. A mounting device according to claim 7 wherein said fastening means is provided with manual means for rotating said fastening member on said stationary member against the force of said spring means.

9. A mounting device comprising in combination, a stationary member having a generally cylindrical configuration formed with a recess for receiving a mounting portion of an object to be mounted thereon, a tubular fastening member mounted on said stationary member for rotation thereon about the axis of said cylindrical configuration, and an arcuate cam surface formed on said tubular fastening member having a center of curvature displaced a predetermined distance from said axis, whereby rotation of said fastening member in one direction on said stationary member causes said cam surface to engage said mounting portion to retain said object in fixed position on said stationary member and rotation of said fastening member in the direction opposite to said one direction causes said cam surface to be disengaged from said mounting portion.

10. A mounting device comprising in combination, a stationary member having a generally cylindrical configuration formed with a recess for receiving a mounting portion of an object to be mounted thereon, a tubular fastening member mounted on said stationary member for rotation thereon about the axis of said cylindrical configuration, an arcuate cam surface formed on said tubular fastening member having a center of curvature displaced a predetermined distance from said axis, and spring means interposed between said stationary member and said fastening member to rotate the latter to cause said cam surface to engage said mounting portion to retain said object in fixed position on said stationary member.

References Cited by the Examiner

UNITED STATES PATENTS

| 1,325,886 | 12/19 | Whitlock | 248—187 |
| 1,629,579 | 5/27 | Langley | 248—187 |
| 1,830,475 | 11/31 | Mayer | 248—187 |
| 1,846,382 | 2/32 | Bing | 248—187 |
| 1,878,320 | 9/32 | Potter | 248—187 |
| 2,459,785 | 1/49 | Allerton | 248—161 |
| 2,834,567 | 5/58 | Young | 248—187 |
| 2,840,334 | 6/58 | Cauthen | 248—187 |

FOREIGN PATENTS 218,499  2/10  Germany.

CLAUDE A. LE ROY, *Primary Examiner.*